June 30, 1942. W. F. RIDGWAY 2,287,833
CUT-OFF MACHINE
Filed Jan. 3, 1939 4 Sheets-Sheet 3
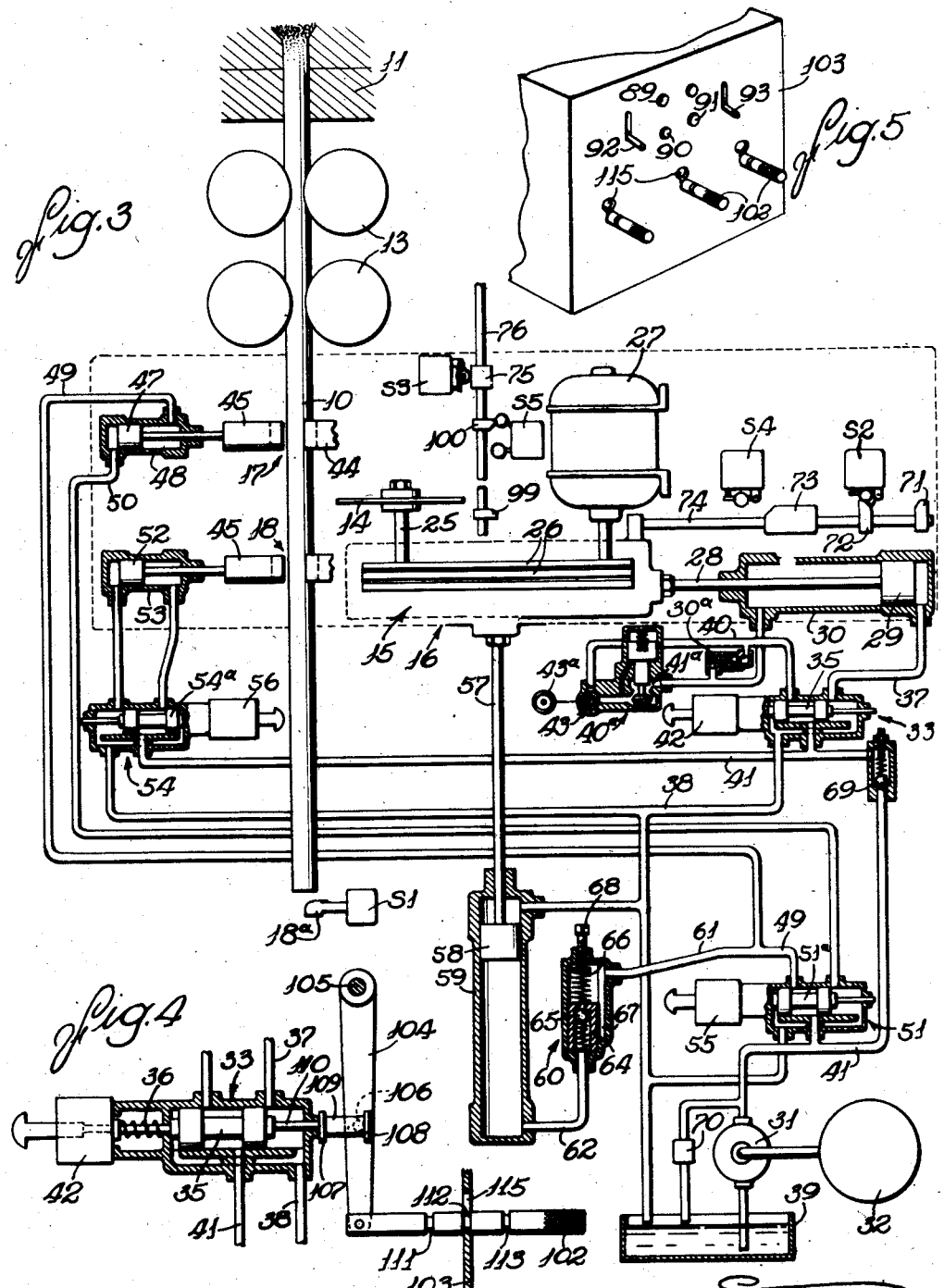

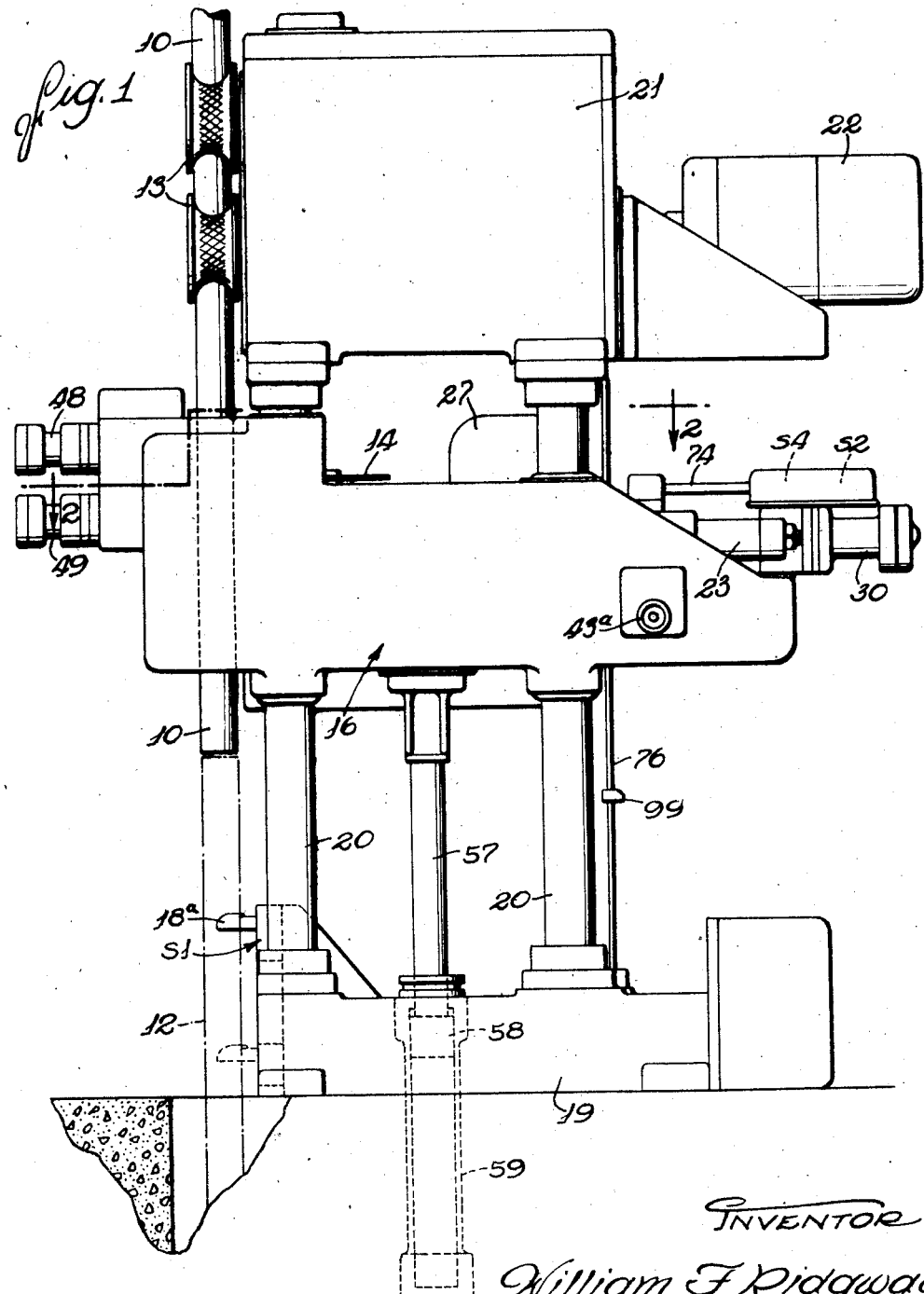

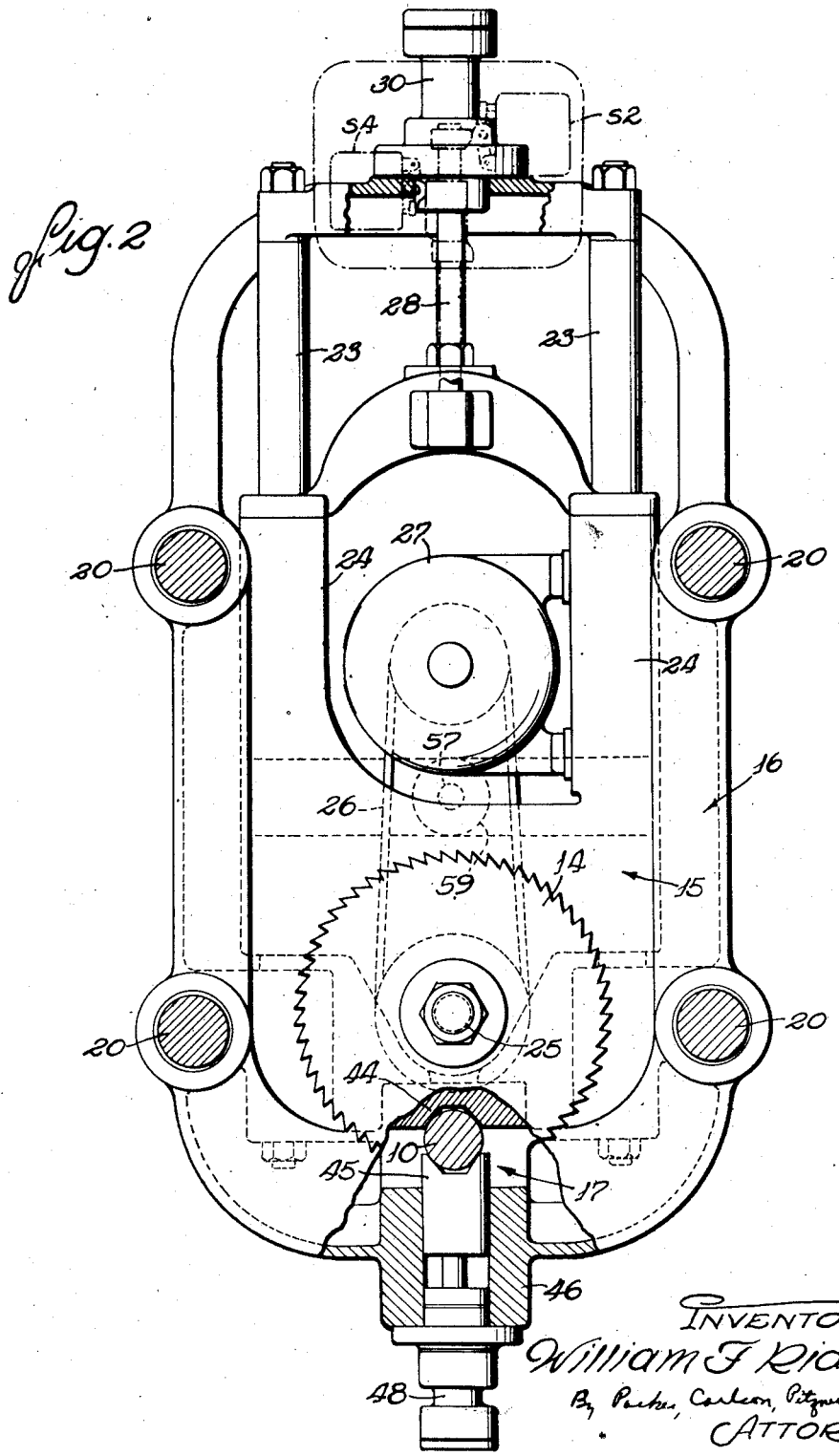

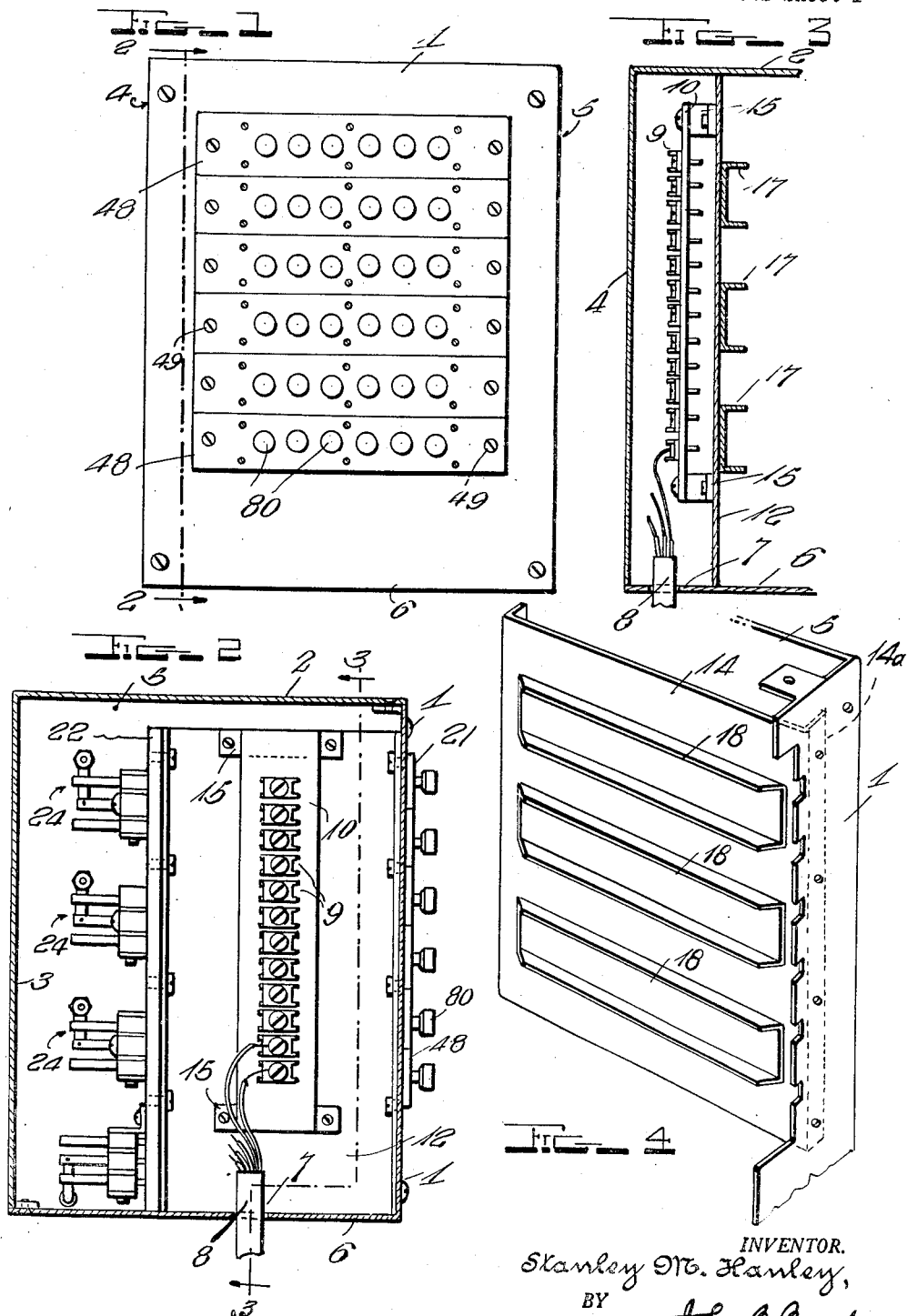

INVENTOR
William F. Ridgway

Patented June 30, 1942

2,287,833

UNITED STATES PATENT OFFICE 2,287,833

CUTOFF MACHINE

William F. Ridgway, Rockford, Ill., assignor to The Ingersoll Milling Machine Company, Rockford, Ill., a corporation of Illinois Application January 3, 1939, Serial No. 248,948

13 Claims. (Cl. 29—69)

This invention relates generally to a machine for cutting a continuously moving piece of stock into successive lengths or longitudinal sections and has more particular reference to machines of the type in which a power driven cutter on a movable head operates to sever the stock during movement of the head while the latter is clamped to the moving stock.

One object is to provide a novel automatic mechanism for controlling various power actuators to enable an operating cycle to be executed safely and reliably without danger of breakage of machine parts or interrupting the stock movement, and this, in spite of the widely varying conditions encountered in service.

Another object is to control the work clamping mechanism in a novel manner such as to synchronize the movements of the stock and tool head accurately and reliably and allow ample time for completion of the different parts of the machine cycle.

A further object is to provide an automatic cut-off machine of the above character incorporating a novel mechanism for enabling the machine cycle to be controlled manually in the event of failure of the power actuated devices by which the cycle is normally governed.

Still another object is to provide a novel and simplified arrangement of electric circuits for controlling the machine cycle.

The invention also resides in numerous provisions contributing to the safety of the machine attendant.

Other objects and advantages of the invention will become apparent from the following detailed description taken in connection with the accompanying drawings, in which:

Figure 1 is a front elevational view of a cut-off machine embodying the present invention.

Fig. 2 is a plan section taken along line 2—2 of Fig. 1.

Fig. 3 is a schematic view and hydraulic circuit diagram.

Fig. 4 is a longitudinal sectional view of a control valve in the hydraulic system together with the actuators for the valve.

Fig. 5 is a fragmentary perspective view of the control panel of the machine.

Figure 6:
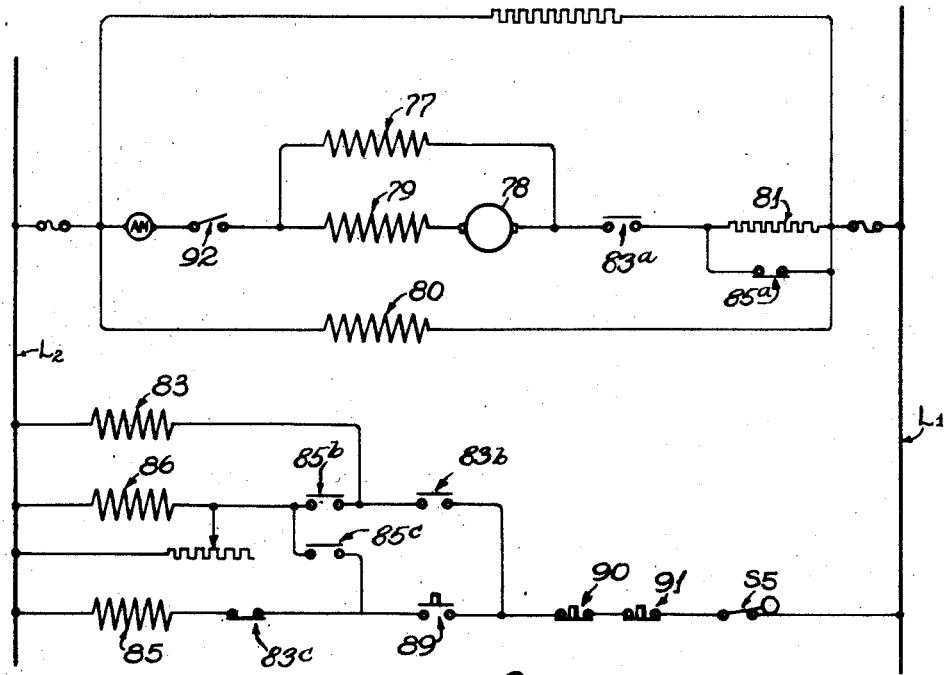
Fig. 6 is a wiring diagram of the operating and control circuits for the cutter motor.

For convenience of illustration of its various novel features, the invention has been shown herein as embodied in a machine particularly adapted for use in severing lengths of stock from a continuously formed bar 10 of copper or the like as it leaves the casting furnace 11. It will be understood, however, that the invention is adapted for operation on a wide variety of work pieces and that there is no intention to limit the invention to the particular application described. On the other hand, the appended claims are intended to cover all modifications and alternative arrangements within the spirit and scope of the invention.

The machine shown in the drawings to illustrate the present invention is adapted to cut successive lengths 12 from the bar 10 as the latter is advanced continuously by two pairs of power actuated rollers 13 engaging opposite sides of the bar and operated at variable speeds according to operating conditions prevailing in the casting furnace or other mechanism by which the bar is formed.

Severing of the stock is effected by a power actuated cutter in the form of a saw 14 on a tool head 15 mounted on a carriage 16 for horizontal movement transversely of the path of the stock. The carriage is slidable vertically along the stock path and carries clamps 17 and 18 by which the carriage may be connected to the stock for movement in unison therewith. When the lower end of the stock 10 has advanced to a predetermined point, a trip dog 18ª is engaged to initiate an automatic cycle. The latter involves actuation of the clamps to grip the stock followed by lowering of the carriage 16, advance of the cutter head 15, retraction of the cutter head after severance of the stock, release of the clamps, and rapid return of the carriage to an uppermost starting position.

The carriage comprises an open frame and is slidable up and down on ways defined by four vertical posts 20 upstanding from the corners of a base 19. At their upper ends, the posts are connected by a housing 21 carrying the feed rollers 13 and actuating mechanism therefor including an electric motor 22 which may be controlled automatically in any desired manner to advance the stock at a rate corresponding to its rate of formation.

Extending crosswise of the carriage frame are horizontal rods 23 received in bearings 24 at opposite sides of the tool head 15, the latter being mounted thus to slide horizontally and feed the saw across the work path. The saw is fast on a vertical shaft 25 journaled in the head 15 and driven through the medium of belts 26 from an electric motor 27 on the tool head.

To feed the saw toward and away from the stock to cut off the latter, the head 15 is connected to a rod 28 of a piston 29 reciprocable in a cylinder 30 on the saddle 16. Pressure fluid is supplied to the cylinder by a pump 31 driven by an electric motor 32 and the fluid flow is controlled by a valve 33. The latter has a member 35 normally urged by a spring 36 into a position in which the head end of the cylinder is connected through a pipe 37 to the return line 38 draining to the sump 39, and the opposite end of the cylinder is connected through a line 40 and a feed control valve 40ª to the pressure supply line 41. When a solenoid 42 is energized, the valve member 35 is shifted against the action of the spring to its opposite position in which the head end of the cylinder 30 is connected to the pressure supply line 41 and the rod end communicates with the return line 38 through an automatic metering valve 41ª and a throttling valve 43 controllable by a manually operable adjuster 43ª to regulate the rate of fluid flow out of the cylinder 30. With the valve thus conditioned, the saw is fed toward and across the path of the stock 10 at a rate regulated by the setting of the valve 43, the valve 41ª acting in a well known manner to limit the volume of oil leaving the cylinder 30 irrespective of pressure variations.

In the present instance, the clamps 17 and 18 are positioned to engage the stock 10 on opposite sides of the saw and each comprises a jaw 44 fixed to the carriage 16 and a movable jaw 45 slidable in a guide 46 and arranged to be moved by an independent hydraulic actuator. In the case of the upper clamp 17, the movable jaw is connected to a piston 47 reciprocable in a cylinder 48 the opposite ends of which lead through pipes 49 and 50 to a control valve 51 of the same construction as the valve 33 and having a member 51ª urged to the left by a spring and shifted to the right when a solenoid 55 is energized. Similarly, the movable jaw of the lower clamp is connected to a piston 52 in a cylinder 53 to and from the opposite ends of which the flow of pressure fluid is controlled by a valve 54 having a member 54ª shifted against the action of its spring by a solenoid 56. Thus, the valve members are urged to unclamping position by springs and are moved to clamping position when the solenoids 55 and 56 are energized.

Means is provided for effecting movement of the carriage 16 along the path of the stock 10 and timing these movements with reference to the operation of the clamps in a manner such as to avoid any strain on the stock that might result in displacement of the stock relative to the feed rolls 13. This means includes an hydraulic actuator which operates to counterbalance substantially the entire weight of the carriage 16 so as to permit lowering of the saddle by gravity at a controlled rate which may be adjusted to correspond closely to the speed at which the stock is fed by the rollers 13.

The hydraulic actuator comprises a rod 57 connected at its upper end to the carriage 16 and carrying a piston 58 slidable in a vertical cylinder 59 supported in the machine base. The upper end of the cylinder is connected to the return line 38 and the lower end communicates through a pipe 62 with the casing of a valve 60 which is connected by a pipe 61 to the pipe 49 through which the flow of fluid is controlled by the valve 51. Slidable in the valve casing is a piston 64 having a central passage therethrough controlled by a check valve 65 and urged by a spring 66 into the position shown in Fig. 3 in which the only connection between the pipes 61 and 62 is through the valve 65. When the pipe 61 becomes connected to the drain line 38 as it will when the solenoid 55 is energized, pressure develops in the lower end of the cylinder 59 due to the weight of the carriage 16. This pressure raises the piston 64 against the spring 66 and permits a flow of fluid around the piston through a passage 67 along the side of the valve casing at a rate controlled by the stress of the spring 66 which may be regulated by a manually adjustable screw 68. Preferably, the normal adjustment of the valve 60 is such that the carriage 16 will, when the pipe 61 is connected to the drain, gravitate at a speed substantially equal to the rate of feed of the stock 10 by the feed rollers 13. By thus counterbalancing substantially the entire weight of the carriage 16, the forces applied to the stock 10 tending to displace it relative to the rollers are very small and not sufficient to overcome the gripping force exerted by the rollers.

The hydraulic counterbalancing mechanism above described also serves as a power actuator for raising the tool saddle to starting position. Thus, when the valve 51 is positioned to admit pressure fluid to the pipes 49 and 61, the piston 64 is seated as shown in Fig. 3, and fluid flows through the check valve 65 to the lower end of the cylinder 59.

In order to definitely insure actuation of the upper clamp 17 with the proper pressure before the advance of the saw occurs, a pressure build-up valve 69 of well known construction is interposed in the supply line 41 at a point between the valve 51 and the valves 33 and 54. The valve 69 is set to pass fluid only when the fluid pressure is above a predetermined value sufficient to insure effective operation of the upper clamp. A pressure relief valve 70 is arranged to by-pass fluid to the sump at a pressure somewhat higher than that for which the valve 69 is set.

Figure 7:
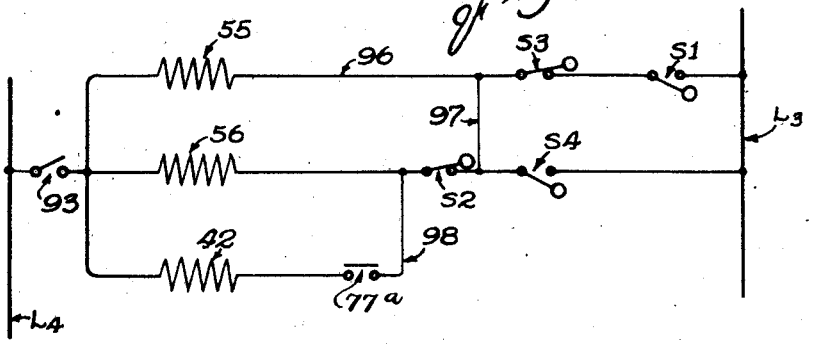
Fig. 7 is a wiring diagram of the cycle control mechanism.

Automatic control of the cut-off machine through repeated cycles of operation is effected by means of an electrical control system associated with the valve actuating solenoids and interlocked in a novel manner with the circuits by which the saw drive motor 27 is controlled. As shown in Fig. 7, the cycle defining circuits are controlled by automatic dog actuated switches S1, S2, S3, and S4, a hand operated switch 92, and contacts 77ª of a relay 77 included in the saw motor circuit (Fig. 6). This latter relay interlocks the saw motor with the cycle control circuit so that the contacts 77ª are closed whenever the saw motor 27 is operating. S1 (see Fig. 1) is mounted on the machine base for vertical adjustment to gauge the length of stock cut off and its movable member is actuated by the dog 18ª which is disposed in the path of the advancing bar 10, the switch being closed when engaged by the bar. The switch is adjustable along the path of the bar to vary the length of the cut-off piece.

The switches S2 and S4 are mounted on the carriage 16 and actuated by dogs 71, 72, and 73 on a horizontal rod 74 on the cutter head 15. The arrangement is such that S2 is closed by the dog 72 at the end of the return movement of the cutter head and is opened by the dog 71 after the saw has been advanced completely through the bar 10. S4 tends to open and is closed by the dog 73 as the saw approaches the bar 10. The dog is elongated to hold the switch closed while the saw is in engagement with the bar 10, the switch opening automatically upon retraction of the saw out of the path of the bar.

S3 is mounted on the vertically movable carriage 16 and normally tends to open. It is held closed by a dog 75 on a stationary vertical rod 76 and is allowed to open in the downward movement of the carriage 16 at a point subsequent in point of time to closure of the switch S4.

To close the contacts 77ᵃ only when the saw motor 27 is operating, these contacts are arranged to be closed during energization of their associated relay winding 77 which is connected in parallel with the armature 78 and series field 79 of the motor between direct current supply lines L1 and L2.

The application of current to the saw motor may be controlled in any preferred way. In the present circuit (Fig. 6), the saw motor 27 is controlled by a normally open push button "start" switch 89, two alternatively available normally closed push button "stop" switches 90 and 91, a normally closed dog operated switch S5, and a hand switch 92, all operating through the medium of a pair of control relays 83 and 85. For convenience, the contacts of these relays have been designated respectively as 83ᵃ, 83ᵇ, 83ᶜ, and 85ᵃ, 85ᵇ, and 85ᶜ. Herein, the shunt field 80 of the saw motor is constantly energized during operation of the machine, and the series field and armature are initially energized through a resistance 81 upon closure of contacts 83ᵃ of the relay 83 when the latter is energized. The starting resistance 81 is shunted out by closure of normally closed contacts 85ᵃ of the relay 85, which occurs as an incident to deenergization of the relay 85. This latter relay has a neutralizing coil 86 for delaying closure of the contacts 85ᵃ and opening of its other sets of contacts 85ᵇ and 85ᶜ, which are normally open. The starting circuit for the motor control relays 83 and 85 extends through the start switch 89 of the push button type, normally closed and manually operable stop and emergency stop switches 90 and 91 and the dog operated switch S5 which remains closed during the normal operation of the machine.

Operation of the machine under normal conditions will now be described, the various switches and valves being conditioned as shown in the drawings, all of the solenoids 42, 55, and 56 being deenergized, the cutter head 15 being held fully retracted by pressure fluid applied to the rod end of the cylinder 30, the clamps being released, and the carriage 16 being held in raised or starting position by pressure applied to the lower end of the cylinder 59. After closure of manually operable switches 92 and 93 to condition the saw motor and control circuits, the start switch 89 is closed manually. This energizes the relay 85 through normally closed relay contacts 83ᶜ, which relay 85 opens its normally closed contacts 85ᵃ to render the starting resistance 81 effective. Energization of the relay 85 also closes its normally open contacts 85ᵇ and 85ᶜ to energize the neutralizing coil 86 and the relay 83. The latter closes its contacts 83ᵇ to establish its own locking circuit and completes the motor starting circuit by closing its other set of contacts 83ᵃ. Upon energization of the relay 83, its contacts 83ᶜ are also opened deenergizing the relay 85 but due to the action of the neutralizing coil 86 of the latter relay, opening of the contacts 85ᵇ and 85ᶜ and closure of the contacts 85ᵃ is delayed sufficiently to allow for proper starting of the motor through the resistance 81. When the contacts 85ᵃ are finally allowed to close, the resistance 81 is shunted out and operation of the motor continues so long as the switches 90, 91, S5 and the manual control switch 92 are allowed to remain closed.

With the saw motor thus operating as evidenced by energization of the relay 77 and closure of its contacts 77ᵃ, repeated cycles of the machine occur automatically in response to successive closures of the switch S1. This switch is closed when the lower advancing end of the bar 10 engages and actuates the dog 18ᵃ, and closure of the switch completes circuits for energizing all of the solenoids 42, 55 and 56 simultaneously. One circuit extends from the alternating current power line L3 through S1, S3, conductor 96, the solenoid 55 to the line L4. Energization of this solenoid shifts the valve member 51ᵃ to connect the pipes 49 and 61 to the drain 38 thereby initiating downward gravitational movement of the carriage 16 at a rate determined by the rate of flow of fluid out of the cylinder 59 through the valve 60. At the same time, the valve 51 admits pressure fluid to the head end of the cylinder 48 to initiate application of the upper clamp 17. By utilizing a common valve 51 to open the outlet from the counterbalancing cylinder 59 and to energize the upper clamp, the carriage will always be conditioned for downward movement before it becomes clamped to the moving bar 10. There is, therefore, no danger of the bar being displaced relative to the feed rollers 13 by forces that would be applied to the bar by engagement of the clamp in advance of conditioning the carriage for downward movement.

The solenoid 56 is energized through a circuit including the switches S1, S3, a conductor 97 and the then closed switch S2. This actuates the valve to condition the latter for the flow of pressure fluid to the head of the cylinder 53, the lower clamp becoming applied when fluid at the proper pressure becomes available.

The circuit for the solenoid 42 is through the switches S1, S3, a conductor 97, S2, a conductor 98, and the relay contacts 77ᵃ. The valve 33 is thus actuated and conditioned for the flow of pressure fluid to the head end of the cylinder 30 of the saw feeding actuator. Owing to the presence of the valve 69 in the fluid supply line 41, pressure fluid will not be available for operating the lower clamp 18 and the saw feed actuator until sufficient pressure has built up in the upper clamp cylinder 48 to produce adequate clamping of the moving stock 10. When such a pressure is developed as a result of effective engagement of the stock by the upper clamp, the valve 69 passes fluid through the valves 33 and 54 to the head ends of the cylinders 30 and 53. Because the cutter head 15 initially offers greater resistance to movement than the jaw of the lower clamp, the fluid first flows to the clamping cylinder and actual feeding of the saw is delayed until the lower clamp has become fully effective. In this way, everything is placed in readiness for proper operation of the saw on the work before feed of the saw can take place.

As the tool head 15 advances in a normal cycle, the switch S4 will be closed as the saw is moved into engaging relation with respect to the bar 10. This establishes parallel circuits for continuing energization of the three solenoids independently of the switches S1 and S3. The latter switch S3 is allowed to open by the dog 75 after a short downward movement of the saddle 16 but, as pointed out above, this always occurs in a normal cycle, after closure of the switch S4.

When the saw has cut through the bar, the switch S2 is opened by the dog 71 thereby deenergizing the solenoids 42 and 56 resulting in retraction of the valve members 35 and 54ᵃ by their springs. Pressure fluid is thus supplied to the rod ends of the cylinders 30 and 53 initiating return of the cutter head 15 and release of the lower clamp 18. Fluid flows to the cylinder 30 through a check valve 30ª. Release of the clamp 18 allows the cut-off length 12 of stock to fall out of the machine and clear of the dog 18ª. Since the solenoid 55 is still energized, the upper clamp 17 remains effective and the carriage 16 continues to gravitate downwardly.

In the return movement of the cutter head 15 but after the saw has passed out of the path of the advancing stock, the dog 73 becomes ineffective allowing the switch S4 to open deenergizing the solenoid 55. This shifts the valve member 51ª to supply pressure fluid to the rod end of the cylinder 48 releasing the upper clamp 17. Through the same valve, pressure fluid flows to the lower end of the cylinder 59. This raises the piston 58 and elevates the carriage 16 to starting position.

The next cycle of the machine is initiated when the lower end of the advancing stock reaches the trip dog 18ª. Thus, successive cycles of the machine are repeated automatically so long as normal operating conditions prevail and the saw motor control relay 83 is allowed to remain energized. The automatic cycle control mechanism may be rendered ineffectual at any time by opening of the hand switch 93. Similarly the saw motor may be stopped by opening any one of the switches 90, 91, and 92.

Numerous safety provisions are made to avoid damage to the saw or other machine parts or interruption of the continuous movement of the stock 10 when abnormal conditions are encountered. For example, if the cut off bar fails to clear the trip dog 18ª properly when the lower clamp 18 is released following completion of the cut, immediate starting of a new cycle before the saw has been retracted and the carriage 16 raised is prevented by the action of the switch S3. Since this switch is open at the time S2 is opened to release the lower clamp and retract the saw, reenergization of the solenoids through S1 can occur only after full retraction of the saw followed by elevation of the carriage 16 substantially toward its starting position at least to a point at which a new cycle may safely be initiated.

The relay contacts 77ª operate to disable the saw feeding mechanism and prevent engagement of the saw with the moving stock in the event that the saw motor is, for any reason, not operating at the start of a cycle and the relay 77 therefore deenergized. Similarly, if the motor is stopped during a cycle either accidentally or by opening the stop switches, the relay will drop out and its contacts 77ª open thereby immediately initiating retraction of the saw out of the path of the advancing stock.

If, for any reason, the saw does not cut through the stock and cause opening of the switch S2 within a predetermined travel of the carriage 16, provision is made for stopping of the saw motor, retracting the cutter head, releasing the clamps and returning of the carriage to starting position. This is effected by the switch S5 on the carriage 16 adapted to be closed under normal conditions. The switch is opened by a dog 99 on the rod 76 when the saddle overtravels to a selected position beyond that at which the stock is severed under normal conditions. Then the switch remains open until the saddle has been returned to its upper starting position at which a dog 100 operates to reclose the switch.

If the switch S5 does, due to overtravel of the saddle 16, become opened, the relay 83 is de-energized and the saw motor stopped, the circuit for the latter remaining open until manual closure of the start switch 89. As an incident to such stopping of the motor, the relay 77 is deenergized and its contacts 77ª opened, thereby deenergizing the solenoid 42 and shifting the valve 33 to cause retraction of the cutter head 15. During this, the switch S4 becomes opened thereby deenergizing the solenoids 55 and 56 which results in release of the clamps 17 and 18 and elevation of the carriage 16, the switch S3 being open at the time.

For certain applications of the improved cut-off machine, it is highly important to provide for continuous movement of the stock being formed and therefore periodic operation of the same irrespective of abnormal conditions that may arise or failure of any parts of the automatic cycle control mechanism. To this end, means is provided for enabling each of the control valves 33, 51 and 54 to be shifted manually to and retained in either of its two positions and this without in any way interfering with the normal automatic operation of the individual valves by their associated springs and solenoids.

In the present instance, the manual actuators for the valves include handles in the form of rods 102 projecting through the switch control panel 103 (Figs. 4 and 5) and mounted for endwise movement into any one of three selected positions. Behind the panel, each handle is pivotally connected to the free end of a lever 104 fulcrumed at 105 and carrying a pin 106 which is disposed between the end flanges 107 and 108 on a spool 109 fast on a projecting stem 110 of the associated valve member. The spool and pin thus provide a lost motion connection having sufficient slack therein to permit the valve member to shift through its normal range under the control of its solenoid when the handle 102 is held in its intermediate position as shown in Fig. 4. To so lock the handle, grooves 111, 112, and 113 spaced along the handle are adapted to receive the defining edge portion of the panel aperture when the handle is lowered with a selected groove disposed in the plane of the panel. When the handle is raised to aline it with an enlarged hole 115 in the panel, it may be shifted endwise to either of two terminal positions. The arrangement is such that when the groove 113 registers with the panel, the pin 106 will engage the flange 107 and the member of the associated valve will be held in its left hand position. When the setting of the handle is determined by the groove 111, the pin will act against the spool flange 108 to shift the valve member in its right hand position, the same as when the associated solenoid is normally energized.

It will be seen that by proper manipulation of the handles 102, the valves 33, 51 and 54 may be shifted to cause operation of the various hydraulically actuated parts in the sequence and timed relation required to cut off the stock in the regular way. Or certain of the valves may, by setting their handles in normal centered position, be adapted for automatic operation while others may be hand operated at the proper time in an automatic cycle. It will thus be seen that the alternative manual actuators for the different valve devices, while normally inactive, are instantly available for use in cycling the machine. Thus, the machine may be operated to permit of continuous formation of the stock 10 even though the automatic cycle control mechanism may, due to accident or for other reasons, fail to operate in the intended manner.

I claim as my invention:

1. A machine for cutting off successive longitudinal sections from a length of stock moving continuously in a downward direction, said machine having, in combination, a vertically movable carriage, a power actuated cutter mounted on said carriage for horizontal movement across the path of said stock, upper and lower clamps on said carriage positioned to grip said stock above and below the line of severance of the stock by said cutter, means responsive to the advance of a predetermined length of stock past the cutter when said carriage is in starting position to initiate downward movement of the carriage, application of said clamps and advance of said cutter, means responsive to severance of the stock by said cutter to release said lower clamp and retract the cutter, and means responsive to retraction of the cutter out of the path of said stock to release said upper clamp and initiate upward movement of said carriage.

2. A machine for cutting off successive longitudinal sections from a length of continuously moving stock, said machine having, in combination, a carriage along the path of the stock, a power actuated cutter mounted on said carriage for movement across the path of said stock, first and second clamps on said carriage respectively positioned to grip said stock ahead of and behind the line of severance of the stock by said cutter, cycle control mechanism operable to initiate movement of the carriage, application of said clamps and advance of said cutter, means responsive to severance of the stock by said cutter to first release said first clamp and cause retraction of the cutter prior to release of said second clamp.

3. A machine for cutting off successive longitudinal sections from a length of stock moving continuously in a downward direction, said machine having, in combination, a vertically movable carriage, a power actuated cutter thereon, a clamp on said carriage for gripping the stock to connect the stock and said carriage together during operation of the cutter thereon, an hydraulic actuator for said clamp, a cylinder and a piston therein associated with said carriage to counterbalance the weight thereof, and a single fluid control valve having a member shiftable to one position to admit pressure fluid simultaneously to said actuator and said cylinder for releasing said clamp and raising said carriage, said member being shiftable to a second position to condition said cylinder for the escape of fluid therefrom and to simultaneously admit pressure fluid to said actuator for applying said clamp whereby said cylinder is conditioned for downward movement of the carriage at least as soon as said clamp becomes effective to connect the carriage to said stock.

4. A machine for cutting off successive longitudinal sections from a length of stock moving continuously in a downward direction, said machine having, in combination, a vertically movable carriage, a power actuated cuter thereon, a clamp on said carriage for gripping the stock, an hydraulic actuator for said clamp, a cylinder and a piston therein associated with said carriage to counterbalance the weight thereof, and means controlling the flow of pressure fluid to and from said actuator and cylinder, said last mentioned means including a single valve for conditioning said cylinder for the escape of fluid therefrom and for simultaneously admitting pressure fluid to said actuator to apply said clamp whereby said cylinder is conditioned for downward movement of said carriage at a time not later than the effective gripping of said stock by said clamp.

5. A machine for cutting off successive longitudinal sections from a continuously moving length of stock, said machine having, in combination, a carriage movable along the stock path, a power actuated cutter mounted on said carriage for movement across said path, a clamp on said carriage for gripping the stock to connect the same to said carriage, individual power actuators for said carriage, said cutter and said clamp, a trip device disposed in the path of the advancing end of stock, mechanism controlling said actuators in response to actuation of said device by the stock to initiate an automatic cycle including clamping of the stock to the carriage, advance of the carriage, feed of the cutter to cut off the stock, return of the cutter, release of the clamp and return of the carriage, and means associated with said mechanism to prevent the initiation of another cycle by said device before return of the carriage in the event that the severed length of stock remains in engagement with the device and irrespective of the length of carriage travel in the preceding cycle.

6. A machine for cutting off successive longitudinal sections from a continuously moving length of stock, said machine having, in combination, a carriage movable along the stock path, a power actuated cutter mounted on said carriage for feed movement across said path, a clamp on said carriage for gripping the stock to connect the same to said carriage, individual hydraulic actuators for said carriage, said cutter and said clamp, valves controlling the flow of pressure fluid to and from said actuators, solenoids controlling the shifting of the respective valves, a trip device disposed in the path of the advancing end of said stock, mechanism controlling the selective energization of said solenoids and responsive to said device and to the movements of said cutter to define an automatic cycle of said actuators including clamping of the stock to said carriage, advance of the carriage, feed of the cutter to cut off the stock, return of the cutter, release of the clamp, and return of the carriage, individual manually operable actuators for the valves controlling said feed movement of said cutter by which such valves may be shifted into either of two positions independently of said solenoids, and means associated with each manual actuator to retain the same in either of two valve actuating positions or in a third position in which latter position the associated valve is operable independently by its solenoid.

7. A machine for cutting off successive longitudinal sections from a continuously moving length of stock, said machine having, in combination, a carriage movable along the stock path, a power actuated cutter mounted on said carriage for movement across said path, a clamp on said carriage for gripping the stock to connect the same to said carriage, individual hydraulic actuators for said carriage, said cutter and said clamp, valves controlling the flow of pressure fluid to and from said actuators, solenoids controlling the shifting of the respective valves, a trip device disposed in the path of the advancing end of said stock, mechanism controlling the selective energization of said solenoids and responsive to said device and to the movements of said cutter to define an automatic cycle of said actuators including clamping of the stock to said carriage, advance of the carriage, feed of the cutter to cut off the stock, return of the cutter, release of the clamp, and return of the carriage, and individual manually operable actuators by which said valves may be shifted into either of two positions independently of said solenoids.

8. A machine for cutting off successive longitudinal sections from a continuously moving length of stock, said machine having, in combination, a carriage movable along the stock path, a power actuated cutter mounted on said carriage for movement across said path, a clamp on said carriage for gripping the stock to connect the same to said carriage, individual power operators for said carriage, said cutter and said clamp, a plurality of devices for controlling said operators, solenoid actuators selectively energizable to actuate said devices, mechanism controlling the selective energization of said solenoid actuators to define an automatic cycle of said operator including clamping of the stock to said carriage, advance of the carriage, feed of the cutter to cut off the stock, return of the cutter, release of the clamp, and return of the carriage, and individual manually operable actuators for said devices for enabling said operators to be controlled independently of said solenoid actuators.

9. A machine for cutting off successive longitudinal sections from a continuously moving length of stock, said machine having, in combination, a carriage movable along the stock path, a power actuated cutter mounted on said carriage for movement across said path, a clamp on said carriage for gripping the stock to connect the same to said carriage, individual power actuators for said carriage, said cutter and said clamp, means including at least one solenoid adapted when energized to apply said clamp and initiate advance of said carriage and when deenergized to release the clamp and return the carriage, means including a second solenoid adapted when energized and deenergized to respectively advance and retract said cutter, a switch controlling the energization of both of said solenoids and adapted to be closed when the advancing end of said stock has reached a predetermined point, a switch in parallel with said first switch and adapted to be closed while said cutter is disposed in the path of said stock, and a switch controlling said second solenoid and arranged to remain closed during the advance of the cutter, to open after severance of the stock thereby, and to remain open during the return of the cutter.

10. A machine for cutting off successive longitudinal sections from a continuously moving length of stock, said machine having, in combination, a carriage movable along the stock path, a power actuated cutter mounted on said carriage for movement across said path, a clamp on said carriage for gripping the stock to connect the same to said carriage, individual power actuators for said carriage, said cutter and said clamp, a plurality of devices controlling said actuators and spring urged in directions to release said clamp, retract said cutter and retract said carriage, individual solenoids for shifting said devices against the action of their springs, means responsive to the advance of said stock to cause energization of all of said solenoids, means operable upon severance of the stock to deenergize the cutter control solenoid and thereby retract the cutter, and means responsive to retraction of said cutter out of the path of said stock to deenergize the remaining solenoid.

11. A machine tool having, in combination, relatively movable work and tool supports, a power operator for one of said supports, a device shiftable between two positions to control the direction of movement of the movable support by said operator, a power operated clamp for gripping the work piece to clamp it to said work support, a device shiftable to control the application and release of said clamp, solenoid actuators for shifting said devices, mechanism automatically operable to control said actuators and actuate said devices to define an automatic cycle of said machine tool, and independently operable manual actuators for said devices normally held inactive but instantly available to enable said cycle to be initiated or continued under manual control.

12. A machine for cutting off successive longitudinal sections from a continuously moving length of stock, said machine having, in combination, a carriage movable along the stock path, a power actuated cutter mounted on said carriage for movement across said path, a clamp on said carriage for gripping the stock to connect the same to said carriage, individual power actuators for said carriage, said cutter and said clamp, a first switch, a trip device disposed in the path of the advancing end of the stock for closing said first switch upon engagement of said trip device by the stock, mechanism controlling said actuators in response to closure of said first switch by said trip device to initiate an automatic cycle including clamping of the stock to the carriage, advance of the carriage, feed of the cutter to cut off the stock, return of the cutter, release of the clamp and return of the carriage, a second switch connected in series relation with said first switch and thereby operable when open to disable said first switch against the completion of a circuit, and means for retaining said second switch open except when said carriage is close to its initial position, and thereby preventing the initiation of another cycle by said first switch before return of the carriage to its initial position in the event that the severed length of stock remains in engagement with said trip device.

13. A machine tool having, in combination, a tool support and a work support disposed for relative movement, a rotatable tool on said tool support, means including an electric motor having an energizing winding for driving said tool, power actuated means for effecting relative feeding movement between said supports, a relay comprising a pair of contacts and means including an actuating winding for operating said contacts, means for connecting said contacts to disable said power actuated means when said actuating winding is deenergized, and means for permanently connecting said actuating winding in circuit relation with said motor energizing winding and without the interposition of any switches therebetween, to thereby positively insure coincidental energization and deenergization of said windings.

WILLIAM F. RIDGWAY.